March 31. 1925.
W. S. BAILEY
VEHICLE SPRING
Filed Jan. 9, 1923
1,531,899
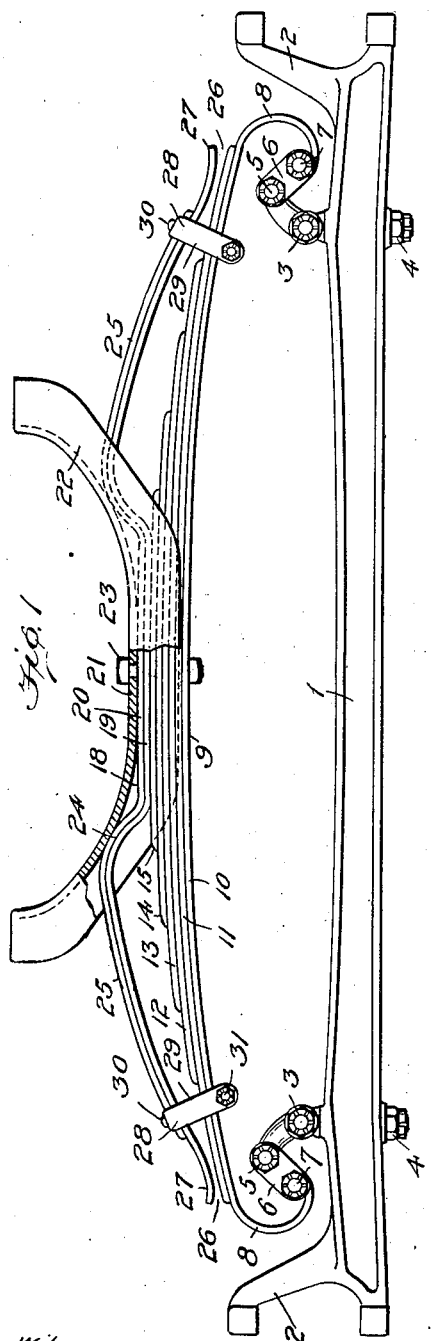
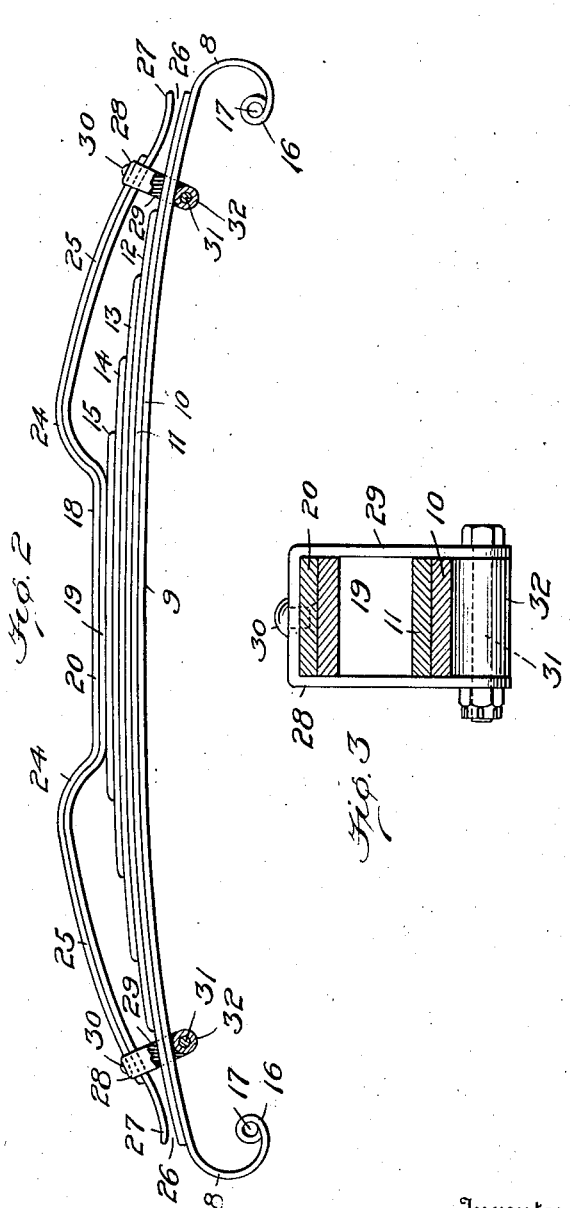
Witness
Edwin L. Bradford
Inventor
W. S. Bailey
By Wm E Dye
Attorney Patented Mar. 31, 1925.

1,531,899

UNITED STATES PATENT OFFICE.

WALTER S. BAILEY, OF COVINGTON, PENNSYLVANIA.

VEHICLE SPRING.

Application filed January 9, 1923. Serial No. 611,591.

*To all whom it may concern:*

Be it known that I, WALTER S. BAILEY, a citizen of the United States, residing at Covington, in the county of Tioga and State of Pennsylvania, have invented certain new and useful Improvements in Vehicle Springs; and I do hereby declare the following to be a full, clear, and exact description of the invention, such as will enable others skilled in the art to which it appertains to make and use the same.

It is well known that motor vehicles provided with spring suspensions of the type in which a transversely arranged semi-elliptical spring connected at its central portion to the chassis and at its ends to an axle, are very jerky and rough riding, and that the springs and the portion of the chassis to which they are connected frequently break when one wheel drops into a rut or suddenly strikes an uneven surface.

An object of the present invention is the production of vehicle springs which are of peculiarly simple construction, are comparatively economical to install, as well as to maintain, and are capable of imparting to vehicle bodies a grace and ease of movement under varying load and road conditions, that insure a maximum degree of comfort to occupants of vehicles so equipped.

A further object is to furnish a spring of greater length than the usual spring so that the body of the vehicle to which the spring is attached will ride easier than the body of a vehicle having ordinary springs.

Another object is to provide a spring structure including a main spring which will normally bear the weight of the vehicle body with its normal load and an auxiliary spring which will automatically come into action when the vehicle body is overloaded or when the running gear is subjected to a sudden strain by being driven over rough surfaces. The present construction is such that the elongated main spring bears the normal load of the body, while the auxiliary spring automatically cooperates with the main spring when an excessive load is placed on the body or when the running gear of the vehicle is subjected to sudden strains because of road inequalities.

A still further object is to furnish a spring having the last mentioned characteristics, in which the auxiliary spring will also function as a rebound snubber.

A further object is to provide a spring system which will eliminate the breaking of the main spring and the front bar or spring bolster of the chassis. In the present construction the main spring structure will engage the front or spring bolster of the chassis for a considerable distance upon each side of its center and the auxiliary spring will bear normally upon opposite sides of said bolster at points beyond the contact area of the main spring.

A still further object is to provide an efficient spring system which functions as a single long easy riding spring under usual conditions, and as a heavy double spring under unusual conditions, and further a spring system not liable to break under any conditions. The length, shape and hanging of the spring system is such, that it eliminates the side sway between the body frame and axle, thereby taking the jerky motion off the steering gear and rendering certain types of motor vehicles much easier to steer.

With the foregoing objects outlined and with other objects in view which will appear as the description proceeds, the invention consists in the novel features hereinafter described in detail, illustrated in the accompanying drawings and more particularly pointed out in the appended claims.

Referring to the drawing:

Figure 1 is a front view of a motor vehicle axle and end frame bar with the improved spring attached thereto, a portion of the end bar being in section for the purpose of illustration.

Fig. 2 is a front view of the spring with certain parts in section.

Fig. 3 is an enlarged sectional view illustrating the manner of clipping or fastening the outer ends of the auxiliary spring to the main spring.

For purposes of the present disclosure, the spring structure has been illustrated in connection with the front axle and front cross bar of a Ford automobile, but obviously the improved spring structure may be applied to vehicles of other type as well.

In the drawing, 1 designates the axle provided at its ends with brackets 2 to which the stub axle pintles are usually attached. 3 designates horns which in the ordinary constructions extend toward each other but for purposes of the present invention, the nuts 4 of said horns are loosened and the horns are turned outwardly to the position shown in Figure 1, after which the nuts 4 are tightened. It will be recognized that in ordinary constructions the spring is of a length to extend between the horns 3 when said horns are directed toward each other, while the turning of the horns outwardly in the present case permits the employment of longer springs. The upper ends of these horns are pivotally connected by bolts 5 to shackles 6, and the lower ends of these shackles are pivotally connected by bolts 7 to the ends 8 of the spring structure 9. The spring structure 9 preferably consists of a number of graduated spring leaves 10, 11, 12, 13, 14 and 15, the leaves decreasing in length upwardly. The lower or longest leaf 10 has its ends turned downwardly as illustrated and then turned toward each other as shown at 16, the extremities of the leaf being curled to provide apertures 17 through which the bolts 7 extend. This main spring consisting preferably of the six leaves mentioned cooperates with an auxiliary spring 18, preferably formed of two leaves 19 and 20. The intermediate portions of the leaves 19 and 20 conform in shape to the upper surface of the leaf 15 of the main spring in order to provide an elongated contact surface between the main spring and the auxiliary spring at the center, and to furnish an elongated surface adapted to engage the substantially horizontal portion 21 of the front channel bar 22 of the chassis, as shown in Figure 1. As a single bolt only 23 is passed through the center of the leaves of the main and auxiliary springs, it will be seen that the elongated contact surfaces between the intermediate portion of the auxiliary spring and the horizontal portion of the channel bar 22, will aid in preventing breaking of the spring leaves or of the channel bar when excessive strains or shocks are encountered. At this point, it may be mentioned that in the ordinary construction the single bolt 23 passing through the central portion of the usual front spring, often weakens and causes the front channel bar to break when excessive shock occurs, and by providing the construction heretofore described, I eliminate this liability of breakage. To further ensure durability and prevent breakage of the leaves and cross-bar 22, the leaves of the auxiliary springs are curved upwardly as shown at 24 and these curve portions contact with the bar 22, as shown. This provides a permanent bearing between the auxiliary spring and the channel bar.

From the portions 24 of the leaves of the auxiliary spring, the outer portions of the leaves extend downwardly and outwardly in opposite directions as shown at 25 and these portions 25 are spaced from the leaves of the main spring, a space 26 normally remaining between the extremities 27 of the leaf 19 and the upper surface of the extremities of the leaf 11. In order to partially maintain this relation between the leaves 11 and 19, shackles or clips 28 are provided. Each of these shackles, as best shown in Figure 3, consists of an inverted U-shaped metal member 29 which is riveted to the leaf 20 as shown at 30, and the lower ends of the legs of the U-shaped member are connected together by a bolt 31 which extends beneath the lower leaf 10 of the main spring and is provided with a roller 32 which rides along the under surface of said leaf 10. Owing to this construction the outer ends of the auxiliary spring will be held by the clips 28 in a position adjacent to but spaced from the main spring, so that the main spring will take care of normal loads and ordinary shocks, but as soon as the vehicle is overloaded or the running gear is subjected to a sudden shock, the outer ends of the auxiliary spring will engage the outer end portions of the main spring and then the two springs will cooperate to resiliently bear the load or absorb the shocks.

From actual practice I have found that the present spring system enables the vehicle to ride much easier than the vehicles having the ordinary springs, and that excessive loads and abnormal shocks are automatically provided for. Further, I have found that the auxiliary springs function as rebound snubbers.

From the foregoing, I believe that the construction, operation and advantages of the invention will be readily understood, and it is apparent that various changes may be made in the construction disclosed without departing from the spirit of the invention as expressed in the claims.

What I claim and desire to secure by Letters Patent is:

1. A spring structure including in combination a vehicle bolster, a semi-elliptical main spring secured to and having an extended bearing beneath said bolster, an auxiliary spring interposed between said main spring and bolster arranged and adapted to contact with the latter at independent points upon opposite sides of its main bearing and to normally terminate adjacent to but out of contact with the surface of said main spring, and suitable links yieldingly connecting said main and auxiliary springs near their outer ends.

2. A spring structure including in combination a vehicle bolster channelled upon its under surface, a semi-elliptical main spring secured to and having an extended bearing within the channel of said bolster, an auxiliary spring interposed between said main spring and bolster arranged and adapted to contact with the latter at independent points upon opposite sides of its main bearing and normally terminating adjacent to but out of actual contact with the upper surface of said main spring, and suitable links yieldingly surrounding said main and auxiliary springs near their outer ends.

3. A spring structure including in combination a vehicle bolster, main and auxiliary springs secured to and having an extended bearing beneath said bolster, the said auxiliary spring being arranged and adapted to contact with said bolster at additional points upon opposite sides of its main bearing and normally terminating adjacent to but out of actual contact with the upper surface of said main spring, suitable links yieldingly surrounding the main and auxiliary springs near their outer ends, and shackles for pivotally connecting the ends of said main spring to the vehicle axle.

In testimony whereof I affix my signature, in presence of two subscribing witnesses.

WALTER S. BAILEY.

Witnesses:
GEORGE L. DEXTER,
KENNETH YOUMANS.